June 28, 1960   H. STAUBACH   2,942,346
GUN TELESCOPE MOUNTING
Filed Feb. 18, 1958

INVENTOR.
HEINRICH STAUBACH
BY
Toulmin & Toulmin
ATTORNEYS ated June 28, 1960

2,942,346
GUN TELESCOPE MOUNTING

Heinrich Staubach, Midland, Ontario, Canada, assignor to Ernst Leitz Canada Limited, Optical Works, Midland, Ontario, Canada Filed Feb. 18, 1958, Ser. No. 715,896

2 Claims. (Cl. 33—50)

The present invention relates to a gun telescope mounting. More in particular, the present invention relates to a gun telescope mounting with a spring influenced locking bolt and automatic adjusting means.

In a known mounting device, the barrel of a gun bears two separate support members each having a V-shaped contact surface receiving and supporting the cylindrical casing of the telescope. This mounting is unsatisfactory because of the linear contact with the telescope which does not assure a secure and stable mounting and results in substantial wear of the contacting portions. The two supports have to be extremely delicately adjusted and the slightest tilting of one of the two support members will bring the telescope out of line and require a new and difficult adjustment.

According to another known device, the telescope is supported by a pair of supports each consisting of a cylindrical neck portion having at both ends a conical seating surface contacting correspondingly shaped contact surfaces in the lower portion of the telescope and having locking means comprising a spring influenced member exerting a substantially horizontal pressure in the direction of the longitudinal axis of the telescope.

Although this mounting device is somewhat superior to the known device just described, it is still accompanied by considerable disadvantages. The contact surfaces are not sufficiently large to allow for accurate adjustment and a stable support. The comparatively small contact surfaces will be prematurely worn. The locking means operate via a horizontally longitudinally directed force component relative to the telescope and cannot assure a safe locking adapted to resist sudden shocks.

Furthermore, both types of the aforedescribed known devices, subject the central portion of the telescope between the two supports to considerable bending stresses.

It is an object of the present invention to provide a gun telescope mounting effecting and maintaining an accurate adjustment of the telescope relative to the gun barrel.

It is another object of the present invention to provide a gun telescope mounting in which bending stresses of the telescope are virtually eliminated and in which the mutual contact surfaces are subject to a minimum of wear.

It is a further object of the present invention to provide a gun telescope mounting allowing for a quick and uncomplicated mounting and removal of the telescope.

It is yet another object of the present invention to provide a gun telescope mounting safely securing the telescope in a stable, adjusted position on the gun barrel irrespective of sudden shocks applied thereto.

These and further objects and advantages which will become apparent as the description proceeds are achieved by the gun telescopic mounting of the present invention in which the telescope and the gun barrel are provided with support members having axially extending contact surfaces of trapezoidal, prism shaped cross-sections adapted to snugly contact one another. Furthermore, there are provided locking means adapted to securely lock the telescope on the gun barrel by means of a vertically downwardly directed force component.

The present invention will be better understood upon the following detailed description of the accompanying drawings, wherein Figure 1 is a longitudinal, sectional view of the gun telescope mounting of the present invention, shown in locked position;

Figure 1:
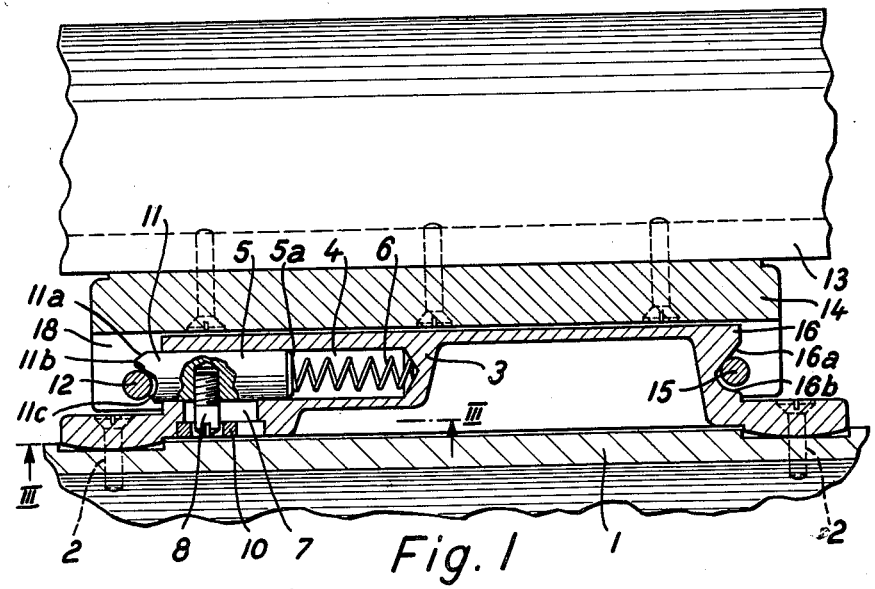
Figure 2:
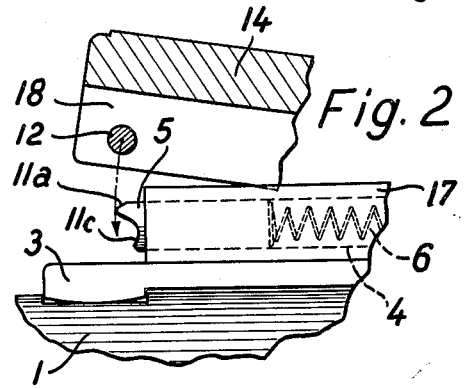
Figure 2 is a longitudinal, sectional view of the locking means in the gun telescope mounting of the present invention, shown in unlocked position.
Figure 3:
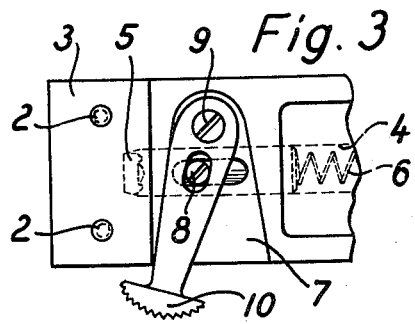
Figure 3 is a partial, sectional view of the support connected with the gun barrel in the gun telescope mounting of the present invention, taken along lines III—III of Figure 1.
Figure 4:
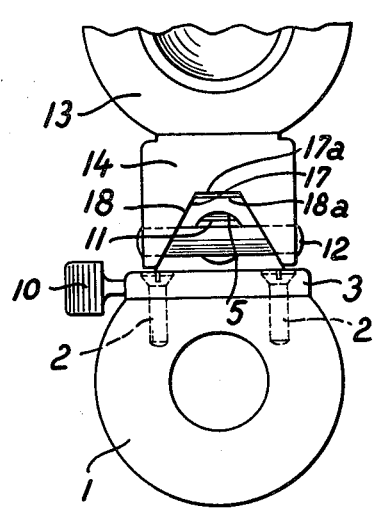
Figure 4 is a front view of the gun telescope mounting of the present invention.

Referring now to the drawings more in detail, the support 3 is mounted upon the gun barrel 1 by means of screws 2. The support 3 is provided with a cylindrical excavation 4 in which there are disposed the bolt 5 and a pressure spring 6 acting against the end 5a of bolt 5. A pin 8 mounted in the bolt 3 projects into indent 7 in the support 3. This pin 8 prevents the bolt 3 from being urged out of the cylindrical excavation 4 by spring 6. Furthermore, the pin cooperates with a lever 10 which can be operated so as to move the bolt 5 against the influence of spring 6 further into the rear end of the cylindrical excavation 4.

At its free end 11 the bolt 5 is provided with an outwardly slanted surface portion 11a, an inwardly slanted surface portion 11b, and a curved indent 11c. At the end 16 opposite to the end having the cylindrical excavation receiving the bolt 5, the support 3 is provided with an inwardly slanted portion 16a and a curved indent, 16b.

The support 3 has an axially extending contact surface 17 having a trapezoidal, prism shaped cross-section. The telescope support 14 has a correspondingly shaped contact surface 18. The telescope support 14 bears at its two opposite ends a first and a second bolt 12 and 15. In the locked position of the telescope mount of the present invention, the bolts 12 and 15 firmly rest against the inwardly slanted surface portions 11b and 16a, respectively.

The telescopic sight is mounted upon the gun barrel 1 in the following manner:

The bolt 15 of the telescope support 14 is inserted into the curved indent in the end portion 16 of the support 3. The telescope 13 is then swivelled about bolt 15 until the bolt 12 at the opposite end of the telescope support 14 comes in contact with the outwardly slanted surface portion 11a of bolt 5. The telescope support 14 is then vigorously pressed downwardly until the bolt 5 is forced to recede against the influence of spring 6 and finally the bolt 12 comes to rest against the inwardly slanted surface portion of bolt 5, whereas the other bolt 15 now contacts the inwardly slanted portion 16a.

The mounting operation can be further facilitated by employing the lever 10 in order to push back the bolt 5.

The telescope is unlocked by actuating lever 10 pushing back the bolt 5 and releasing bolt 12. The telescope 13 can then be swivelled about bolt 15 in upward direction and eventually it can be removed from the gun.

As the bolts 12 and 15 are in contact with the inwardly slanted surfaces 11b and 16a, respectively, the weight of the telescope and the pressure of the spring influenced bolt 5 cooperate to produce a downwardly directed force component effecting equal between the telescope support 14 and the support 3 of the gun. The mounting device of the present invention thus firmly and securely locks the telescope in a vertical and horizontal direction.

In addition, the telescope is prevented from performing even the slightest horizontal displacement while being in locked position, since the trapezoidal, prism shaped contact surfaces 17 and 18, respectively, are in tight mutual contact. An automatic, relative adjustment of gun barrel 1 and telescope 13 is thereby effected and accurately maintained.

This effect can be further improved by slightly spacing apart the surfaces 17a and 18a constituting the smallest sides of the trapezoid.

The mounting and locking of the telescopic sight can be effected in a very simple manner which automatically adjusts the same relative to the gun barrel in order to align in parallel the respective central longitudinal axes of the gun barrel and the telescope, respectively. The telescope mounting of the invention secures the telescope in this adjusted position and assures a safe and stable support irrespective of sudden shocks.

It will be undertood that this invention is susceptible to modification in order to adapt it to different usages and conditions, and, accordingly, it is desired to comprehend such modifications within this invention as may fall within the scope of the appended claims.

What I claim is:

1. A telescope gun sight mounting comprising a support mounted on the barrel of the gun, said support having a cylindrical bore in one end thereof parallel to the axis of the gun barrel and an inwardly sloping undercut in the other end thereof extending transversely of the axis of the gun barrel, a locking bolt slidably received in said cylindrical bore with one end thereof extending from said bore, a spring within said bore urging said bolt outwardly thereof, there being an inwardly sloping undercut in said one end of the bolt and an outwardly sloping portion on the upper edge of said one end of the bolt connecting with said inwardly sloping undercut, a pin projecting downwardly from said bolt, there being a slot in said support slidably receiving said pin, a channel-shaped telescope support having transversely extending pins at the ends thereof to be received in the undercut portions of said support and said bolt when the telescope support is in the locked position upon said support, said support and telescope support having longitudinally extending contact surfaces with a trapezoidal cross section so that said supports snugly fit together, the one end of said bolt being so positioned exteriorly of said support that the engaging of one of said transverse pins on the telescope support with the undercut on the other end of the support will cause the other transverse pin to engage the outwardly sloping portion on said bolt to cam the bolt into the bore so that said bolt inwardly sloping portion will lockingly engage said other transverse pin.

2. A telescope gun sight mounting as claimed in claim 1 and further comprising a pivotally mounted lever engageable with the end of said bolt pin to move said bolt inwardly of said bore against the urging of said spring.

References Cited in the file of this patent

UNITED STATES PATENTS

| | | |
|---|---|---|
| 2,401,825 | Gruver | June 11, 1946 |
| 2,555,030 | Fluty | May 29, 1951 |
| 2,632,251 | Weaver | Mar. 24, 1953 |
| 2,710,453 | Beverly | June 14, 1955 |